(12) United States Patent
Freisler et al.

(10) Patent No.: US 11,618,408 B2
(45) Date of Patent: Apr. 4, 2023

(54) VEHICLE-OCCUPANT RESTRAINT SYSTEM HAVING AN ADDITIONAL AIRBAG

(71) Applicants: ZF AUTOMOTIVE GERMANY GMBH, Aldorf (DE); Audi AG, Ingolstadt (DE)

(72) Inventors: Werner Freisler, Schwäbisch Gmünd (DE); Benjamin Weimer, Spraitbach (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/259,987

(22) PCT Filed: Jul. 22, 2019

(86) PCT No.: PCT/EP2019/069684
§ 371 (c)(1),
(2) Date: Jan. 13, 2021

(87) PCT Pub. No.: WO2020/020827
PCT Pub. Date: Jan. 30, 2020

(65) Prior Publication Data
US 2021/0284096 A1    Sep. 16, 2021

(30) Foreign Application Priority Data

Jul. 23, 2018   (DE) ..................... 10 2018 117 714.3

(51) Int. Cl.
*B60R 21/233*   (2006.01)
*B60R 21/205*   (2011.01)
(Continued)

(52) U.S. Cl.
CPC .......... *B60R 21/233* (2013.01); *B60R 21/205* (2013.01); *B60R 21/214* (2013.01);
(Continued)

(58) Field of Classification Search
CPC ............ B60R 21/015; B60R 21/01512; B60R 21/01554; B60R 21/205; B60R 21/214;
(Continued)

(56) References Cited

U.S. PATENT DOCUMENTS 2,834,606 A * 5/1958 Bertrand ............... B60R 21/214
                                                      280/730.1
5,333,899 A * 8/1994 Witte ................ B60R 21/23138
                                                      280/728.1

(Continued)

FOREIGN PATENT DOCUMENTS

DE         19860827         7/2000
DE         10020353         3/2001
(Continued)

*Primary Examiner* — Laura Freedman
(74) *Attorney, Agent, or Firm* — Tarolli, Sundheim, Covell & Tummino LLP

(57) ABSTRACT

A vehicle occupant restraint system (10) comprises a front airbag (12) and an auxiliary airbag (30) both of which are assigned to a joint vehicle seat (22), wherein, prior to its deployment, the auxiliary airbag (30) is arranged in a roof region of the vehicle and, in the filled state, as a further front airbag extends ahead of a vehicle occupant (24) and between the front airbag (12) and the vehicle occupant (24) in the assigned vehicle seat (22) and bears against the front airbag (12).

11 Claims, 2 Drawing Sheets

(51) Int. Cl.
*B60R 21/214* (2011.01)
*B60R 21/232* (2011.01)
*B60R 21/2342* (2011.01)
*B60R 21/231* (2011.01)

(52) U.S. Cl.
CPC ........ *B60R 21/232* (2013.01); *B60R 21/2342* (2013.01); *B60R 2021/23107* (2013.01)

(58) Field of Classification Search
CPC . B60R 21/232; B60R 21/233; B60R 21/2338; B60R 21/2342; B60R 2021/0004; B60R 2021/01034; B60R 2021/01231; B60R 2021/23107; B60R 2021/23192; B60R 2021/23308; B60R 2021/23316; B60R 2021/23324; B60R 2021/23382; B60R 2021/23386
See application file for complete search history.

(56) References Cited

U.S. PATENT DOCUMENTS

| | | | |
|---|---|---|---|
| 5,670,853 A | 9/1997 | Bauer | |
| 6,224,088 B1* | 5/2001 | Lohavanijaya | B60R 21/23184 280/728.1 |
| 7,040,653 B1* | 5/2006 | Breed | G06F 30/23 280/731 |
| 8,398,113 B2* | 3/2013 | Choi | B60R 21/207 280/730.1 |
| 8,403,358 B2* | 3/2013 | Choi | B60R 21/214 280/728.2 |
| 8,573,634 B2* | 11/2013 | Choi | B60R 21/214 280/730.1 |
| 8,579,321 B2* | 11/2013 | Lee | B60R 21/231 280/729 |
| 9,446,733 B2* | 9/2016 | Pausch | B60R 21/207 |
| 10,266,145 B2* | 4/2019 | Paxton | B60R 21/2338 |
| 10,407,018 B2* | 9/2019 | Sundararajan | B60R 21/2338 |
| 10,836,337 B2* | 11/2020 | Shin | B60R 21/01512 |
| 11,052,853 B2* | 7/2021 | Choi | B60R 21/015 |
| 11,124,146 B2* | 9/2021 | Saso | B60R 21/205 |
| 11,180,106 B2* | 11/2021 | Kanegae | B60R 21/0134 |
| 11,203,321 B2* | 12/2021 | Tanaka | B60R 21/23138 |
| 2002/0149181 A1 | 10/2002 | Eyrainer et al. | |
| 2003/0218319 A1 | 11/2003 | Amamori | |
| 2005/0104340 A1 | 5/2005 | Hasebe et al. | |
| 2008/0129023 A1 | 6/2008 | Heigl et al. | |
| 2019/0135220 A1* | 5/2019 | Rupp | B60R 21/237 |

FOREIGN PATENT DOCUMENTS

| | | | |
|---|---|---|---|
| DE | 102014018877 | | 6/2016 |
| DE | 202018103017 | | 9/2018 |
| DE | 102017006274 | | 12/2018 |
| JP | 2014218215 A | * | 11/2014 |
| JP | 2017065341 A | * | 4/2017 |
| JP | 2019038370 A | * | 3/2019 |
| JP | 2019196156 A | * | 11/2019 |
| JP | 2021030815 A | * | 3/2021 |
| JP | 2021037922 A | * | 3/2021 |
| WO | 0074979 | | 12/2000 |

* cited by examiner

VEHICLE-OCCUPANT RESTRAINT SYSTEM HAVING AN ADDITIONAL AIRBAG

RELATED APPLICATIONS

This application corresponds to PCT/EP2019/069684, filed Jul. 19, 2019, which claims the benefit of German Application No. 10 2018 117 714.3, filed Jul. 23, 2018, the subject matter of which are incorporated herein by reference in their entirety.

BACKGROUND OF THE INVENTION

The invention relates to a vehicle occupant restraint system comprising a front airbag.

Front airbags for drivers and passengers of an automotive vehicle have proven themselves in occupant protection. Due to their general design, they can be properly optimized for a particular standard position of an assigned vehicle seat and a vehicle occupant in said vehicle seat. The protection of a vehicle occupant who is in a deviating position requires complex measures, however.

At present, however, there is a trend toward vehicle occupants increasingly varying their sitting position inside the vehicle even during traveling. This is discussed especially in connection with autonomous driving. For example, the vehicle occupants may also adopt "comfort positions" in which their vehicle seat is further distant from the vehicle front end than in the standard position, or in which the seat back takes a more strongly reclined position.

SUMMARY OF THE INVENTION

It is the object of the invention to provide a vehicle occupant restraint system in a simple manner by which the protection for vehicle occupants who are not seated in a standard position can be improved.

This object is achieved by a vehicle occupant restraint system comprising the features of claim 1. The vehicle occupant restraint system comprises a front airbag and an auxiliary airbag both of which are assigned to a joint vehicle seat. Prior to its deployment, the auxiliary airbag is arranged in a roof region of the vehicle and in the filled state extends as a further front airbag ahead of a vehicle occupant in the assigned vehicle seat. In the filled state, the auxiliary airbag is located between the front airbag and the vehicle occupant and bears against the front airbag.

The front airbag may be a known driver airbag that is arranged, prior to being activated, in an airbag module in a steering wheel of the vehicle, or may be a known passenger airbag that is accommodated in an instrument panel of the vehicle.

In each case, the airbag module containing the auxiliary airbag is preferably disposed at a position inside the vehicle different from that of the airbag module of the front airbag.

It is possible to integrate the auxiliary airbag in an existing vehicle occupant restraint system comprising a conventional front airbag.

The auxiliary airbag should extend, relating to a vehicle transverse direction, in the same region as the front airbag, wherein the auxiliary airbag may be narrower along the vehicle transverse direction than the front airbag. However, extensive overlapping between the auxiliary airbag and the front airbag along the vehicle transverse direction is desirable.

Along the vehicle longitudinal direction, viz. normal to the vehicle transverse direction, the expansion of the filled auxiliary airbag is preferably smaller than that of the filled front airbag.

An initial deployment direction of the auxiliary airbag preferably includes a component facing a tail of the vehicle so that the auxiliary airbag at least partially deploys in the direction of the vehicle occupant from the roof region. The main deployment direction of the auxiliary airbag is advantageously directed from the roof region downwards into the vehicle interior.

Preferably, the auxiliary airbag exerts a direct restraining effect on the vehicle occupant. For this purpose, the auxiliary airbag advantageously includes a baffle and an opposite bearing surface, wherein, in the filled state of both airbags, the bearing surface of the auxiliary airbag rests on a baffle of the front airbag.

Of preference, the auxiliary airbag is configured and disposed so that, in the filled state, it covers at least 60%, especially at least 80% of the baffle of the front airbag, when viewed in the direction to the vehicle front end, at least along the vehicle transverse direction and preferably relating to the total surface of the baffle of the front airbag.

The auxiliary airbag which, when viewed along the vehicle longitudinal direction, is located further in the direction to the vehicle center than the front airbag can utilize the filled front airbag for stabilization so as to exert a sufficient restraining effect on the vehicle occupant.

For this reason, the auxiliary airbag may also have a significantly smaller volume and, where necessary, a lower internal pressure than the front airbag, which is also beneficial to a quick deployment of the auxiliary airbag. For example, the auxiliary airbag has a filling volume of approx. 20 to 30 l, especially approx. 25 l. In the filled state, the auxiliary airbag may have an internal pressure of approx. 100 to 500 hPa, especially 200 to 300 hPa.

Of advantage, the front airbag and the auxiliary airbag are provided to be fillable independently of each other so that optionally only the front airbag or the front airbag and the auxiliary airbag can be filled. If the vehicle seat and/or the vehicle occupant is in the standard position, a front airbag adapted to said position can solely take over the restraining effect so that only the front airbag is activated and the auxiliary airbag is not filled. However, if the vehicle seat and/or the vehicle occupant is not in the standard position, the auxiliary airbag is additionally filled, if this helps improve the protection of the vehicle occupant.

If both airbags are filled, preferably the auxiliary airbag is activated with a certain time offset after the front airbag so that the front airbag already is at least partially filled, when the auxiliary airbag deploys from the roof region. Thus, a substantially trouble-free deployment of both airbags is safeguarded. Moreover, in this way the auxiliary airbag can be smoothly guided along the baffle of the front airbag to its final position in the filled state.

The decision of whether or not the auxiliary airbag is activated can be taken, for example, by means of a position detection system for detecting a position of the assigned vehicle seat and/or of the vehicle occupant in the vehicle seat, which position detection system is part of the vehicle occupant restraint system. Then, a control unit can decide on optionally releasing the auxiliary airbag in response to the data supplied by the position detection system.

The auxiliary airbag should have a certain mobility to be capable of compensating for a movement of the vehicle occupant while the latter immerses into the auxiliary airbag.

In this way, the vehicle occupant can be stabilized in its position during the restraining process.

In order to obtain such mobility, the auxiliary airbag preferably has at least one flexible structure with bulges and recesses which is provided especially on the baffle of the auxiliary airbag.

In a preferred embodiment, the flexible structure comprises a first flexible structure in a neck portion of the auxiliary airbag which is configured at a transition from an inflation end to a cushion-shaped portion of the auxiliary airbag.

The first flexible structure includes, especially in the filled state, plural inflatable cells sequential along a vehicle vertical direction each of which forms a bulge of the baffle of the auxiliary airbag. Thus, certain flexibility is imparted to the auxiliary airbag along the vehicle vertical direction.

Alternatively, or additionally, the flexible structure may comprise a second flexible structure which is provided in a free end region of the auxiliary airbag and which includes especially plural inflatable cells sequential along the vehicle transverse direction, each forming a bulge on the baffle of the auxiliary airbag. By means of the second flexible structure, certain flexibility can be imparted to the auxiliary airbag along the vehicle transverse direction. The free end region preferably forms the end of the cushion-shaped portion and of the baffle of the auxiliary airbag.

The inflatable cells of the flexible structure may be arranged in parallel to each other.

As an alternative or as an additional solution to the flexible structure, in the filled state the auxiliary airbag may also include, in the area of the baffle, an area of reduced thickness or a cutout in the form of a continuous opening, with the area of reduced thickness or the cutout being spanned by a non-inflatable panel portion in the manner of a trampoline. The non-inflatable panel portion forms part of the baffle. This design equally ensures increased flexibility of the baffle of the auxiliary airbag and allows for softer absorbing as well as for compensating a movement of the vehicle occupant at the moment when the vehicle occupant immerses into the auxiliary airbag.

The non-inflatable panel portion may be formed, for example, by a single layer of an airbag fabric. Preferably, the non-inflatable panel portion is disposed so that at its edges it merges into the panel of the inflatable area of the baffle.

It is possible to provide a non-inflatable panel portion that covers the region of reduced thickness and, resp., the cutout only on the baffle or both on the baffle and on the bearing surface.

In order to further increase the flexibility of the auxiliary airbag, the non-inflatable panel portion may have at least one fold which is fixed by a means opening in the case of a predetermined load. Under certain conditions, when the vehicle occupant immerses into the auxiliary airbag, the length of the non-inflatable panel portion thus can be increased along the vehicle transverse direction and/or the vehicle vertical direction, which results in higher resilience of the baffle. Thus, a movement of the vehicle occupant while the latter immerses into the auxiliary airbag can be better absorbed.

The means may be, for example, a tear seam by which the fold is held together in a dart.

It is also imaginable to provide an active system that may be triggered by the control unit of the position detection system, where necessary, and that releases a previously held region of the non-inflatable panel portion under certain predetermined conditions.

BRIEF DESCRIPTION OF THE DRAWINGS

Hereinafter the invention shall be described in detail by way of plural embodiments with reference to the attached figures, wherein.

DESCRIPTION

Figure 1:
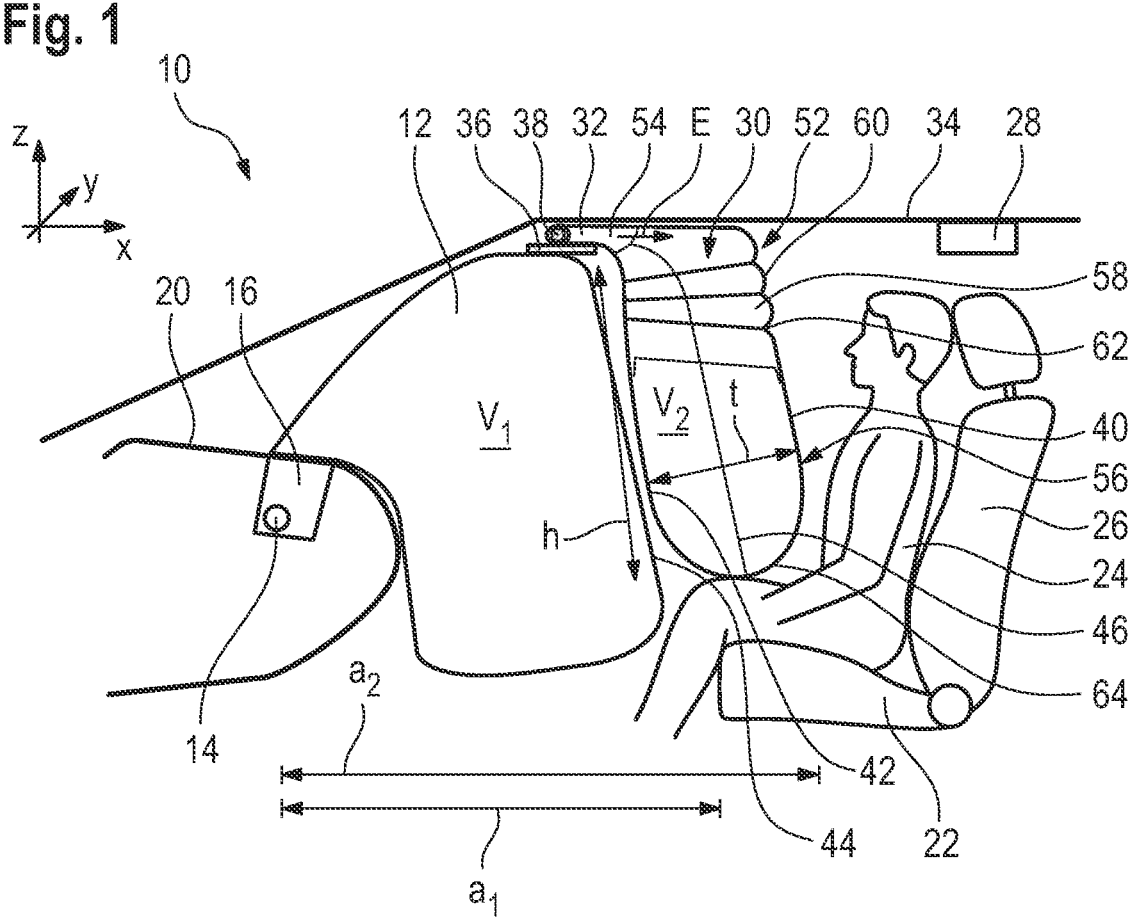
FIG. 1 shows a schematic sectional view of a vehicle occupant restraint system comprising an auxiliary airbag according to the invention as set forth in a first embodiment.

FIG. 1 illustrates a vehicle occupant restraint system 10 in a vehicle, a passenger car in this case.

The vehicle occupant restraint system 10 comprises a front airbag 12 having a first filling volume $V_1$ which is filled with filling gas by an inflator 14 when the front airbag 12 is activated.

In this embodiment, the front airbag 12 is a conventional passenger airbag which, prior to activation, is accommodated being folded into a package in an airbag module together with the inflator 14 in a module holder 16 in an instrument panel 20 of the vehicle.

However, the front airbag 12 could just as well be a driver airbag which, prior to being deployed, is accommodated in an airbag module in a steering wheel of the vehicle.

A vehicle seat 22 in which a vehicle occupant 24 can take a seat (indicated in FIG. 1) is assigned to the front airbag 12. The vehicle seat 22, a seat back 26 of the vehicle seat 22 and/or the occupant 24 may adopt different positions with respect to a vehicle longitudinal direction x, the seat back 26 being adjustable, for example, also in its angle of inclination.

For the vehicle seat 22 a standard position is defined which in FIG. 1 is illustrated having the distance $a_1$ from the instrument panel 20. But the standard position may alternatively or additionally relate to an adjusting angle of the vehicle seat back 26 and/or to a current position of the occupant 24.

The position of the vehicle seat 22, of the vehicle occupant 24 and/or a position of the seat back 26 can be detected by a position detection system 28 indicated in FIG. 1 and provided in the vehicle interior which transmits its measuring data to a control unit (not shown). The control unit may be part of a controller of the entire vehicle occupant restraint system 10, for example. The position detection system 28 may be realized in any suitable manner.

If the vehicle seat 22 and/or the vehicle occupant 24 is in the standard position, the control unit decides, upon activation of the vehicle occupant restraint system 10, to fill exclusively the front airbag 12, as the vehicle occupant 24 is in a position optimal for said airbag.

If it is determined, however, that the vehicle seat 22, the vehicle occupant 24 and/or the seat back 26 are not in the standard position, which is indicated in FIG. 1 by the distance $a_2$, the control unit can decide to activate an auxiliary airbag 30 in addition to the front airbag 12.

Hence it is possible to fill only the front airbag 1 or to fill the front airbag 12 and the auxiliary airbag 30. Filling of the auxiliary airbag 30 alone is not provided, however.

In the cases in which the auxiliary airbag 30 is to be filled, basically the front airbag 12 is activated first. Only when the latter is completely or partly filled, will also the auxiliary airbag 30 be activated.

Prior to its deployment, the auxiliary airbag 30 is accommodated in an airbag module in a module holder 32 at a roof region 34 of the vehicle. In this example, the module holder 32 is provided in the area of a sun visor 36. The auxiliary airbag 30 is filled via a separate inflator 38. The inflator 38 may be disposed on a roof rail of the vehicle (not shown).

In the folded state, the auxiliary airbag 30 is accommodated in the module holder 32 so that an initial deployment direction E of the auxiliary airbag 30 has a component which is directed along the vehicle longitudinal direction x toward the vehicle seat 22. However, the main deployment direction of the auxiliary airbag 30 is located along the vehicle vertical direction z in the direction downwards from the roof region 34.

In the filled state, the auxiliary airbag 30 extends between the vehicle occupant 24 and the front airbag 12 and forms an additional front airbag for the vehicle occupant 24.

The auxiliary airbag 30 includes a baffle 40 as well as an opposed bearing surface 42. The auxiliary airbag 30 is configured and disposed such that, in the filled state of both airbags (viz. of the front airbag 12 and the auxiliary airbag 30), the bearing surface 42 rests flatly on a baffle 44 of the front airbag 12. The small space between the airbags 12, 30 is present only for distinguishing the outlines thereof in the drawings.

The auxiliary airbag 30 has a second filling volume $V_2$ which is smaller than the filling volume $V_1$ of the front airbag 12.

The filling volume $V_2$ of the auxiliary airbag 30 may amount to approximately 25 l, for example, whereas the filling volume $V_1$ of the front airbag 12 may amount to approximately 140 l. An internal pressure of the auxiliary airbag 30 may be selected to range from about 200 to 300 hPa, for example.

The depth t of the auxiliary airbag 30, viz. a distance between the baffle 40 and the bearing surface 42 in the filled state, approximately along the vehicle longitudinal direction x, is less than an extension of the front airbag 12 in the same direction.

The extension h of the auxiliary airbag 30 along the baffle 44 of the front airbag 12 approximately along the vehicle vertical direction z is selected to be shorter than the baffle 44 in this direction and amounts, for example, to approx. 60 to 90% of the extension of the baffle 44.

A horizontally measured width b of the baffle 40 of the auxiliary airbag 30 along a vehicle transverse direction y may amount to about 60% of a width of the baffle 44 of the front airbag 12, for example, but may as well be selected to be larger.

In general, it applies that the baffle 40 of the auxiliary airbag 30 extends over a substantial part of the baffle 44 of the front airbag 12, wherein the surface area of the baffle 40 of the auxiliary airbag 30 may amount, for example, to at least 60 to 80% of the surface area of the baffle 44 of the front airbag 12.

For stabilizing the shape of the filled auxiliary airbag 30, an inner panel 46, such as made from an airbag fabric, may be provided inside the auxiliary airbag 30 between the baffle 40 and the bearing surface 42 and approximately in parallel to the baffle 40.

In order to increase a mobility of the auxiliary airbag 30, the latter has at least one flexible structure 48, 50.

In the first embodiment, a first flexible structure 48 is formed in a neck portion 52 of the auxiliary airbag 30 which forms a transition from an inflation end 54 to a cushion-shaped portion 56 of the auxiliary airbag 30. The neck portion 52 has a smaller width in the vehicle transverse direction y than the cushion-shaped portion 56, but the vehicle occupant-side part thereof may nevertheless form part of the baffle 40.

The first flexible structure 48 in this case consists of plural parallel inflatable cells 58 sequential along the vehicle vertical direction z (see FIGS. 1 and 2) which cells generate, on the outer surface of the auxiliary airbag 30 facing the vehicle occupant 24, sequential bulges 60 and recesses 62 similar to bellows. The cells 58 in this example are formed by partitions extending between the baffle 40 and the bearing surface 42. All cells 58 are fluid-communicated with each other and with the inflation end 54 as well as with the cushion-shaped portion 56 of the auxiliary airbag 30 connected in the direction to a free end region 64.

Figure 2:
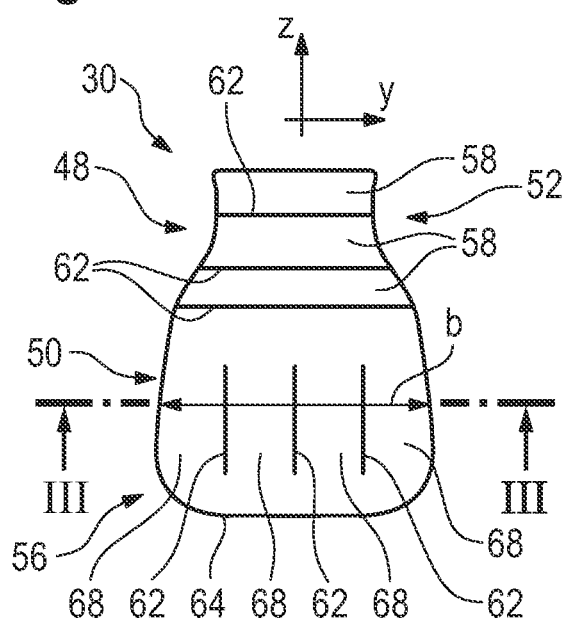
FIG. 2 shows a schematic front view onto the filled auxiliary airbag of the vehicle occupant restraint system of FIG. 1.
Figure 3:
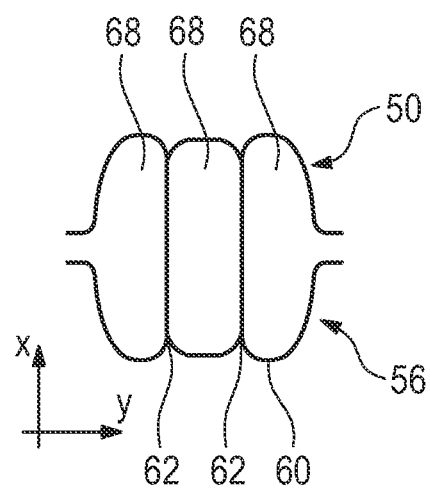
FIG. 3 shows a schematic sectional view of the auxiliary airbag of FIG. 2 along the line III-III.

Moreover, the auxiliary airbag 30 includes a second flexible structure 50 (see FIG. 2) provided in the cushion-shaped portion 56. The second flexible structure 50 in this case consists of plural vertical parallel inflatable cells 68 sequential along the vehicle transverse direction y, which cells form sequential bulges 60 and recesses 62 along the vehicle transverse direction y. This is illustrated in FIGS. 2 and 3.

Due to the two flexible structures 48, 50, the auxiliary airbag 30 obtains certain mobility and can follow, for example, a movement of the immersing vehicle occupant 24 along the vehicle vertical direction z as well as along the vehicle transverse direction y by a certain degree. This compensates for a movement of the immersing vehicle occupant 24 and stabilizes the position of the latter.

Figure 4:
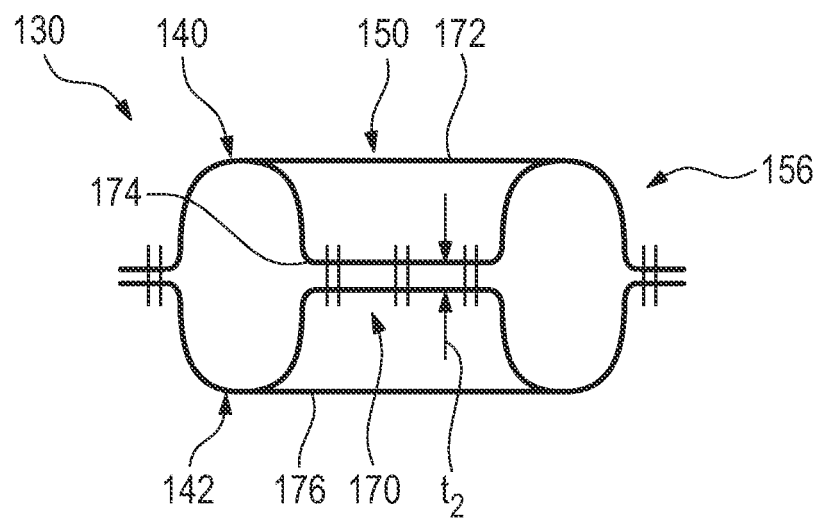
FIG. 4 shows a schematic sectional view of an auxiliary airbag according to the invention as set forth in a second embodiment.

FIG. 4 illustrates an auxiliary airbag 130 in a second embodiment. There is only shown a section across the cushion-shaped portion 156 and the second flexible structure 150 formed thereon.

In this embodiment, the second flexible structure 150 is formed by a region 170 having reduced depth $t_2$ in which the baffle 140 and the bearing surface 142 are fixed to each other without any space or with a small space only. The region 170 having reduced depth may constitute a non-inflatable region of the auxiliary airbag 130.

The region 170 having reduced depth is spanned by a non-inflatable panel portion 172 which is fixed to the baffle 140 along a periphery 174 of the region 170 having reduced depth, and which forms an absorbing surface for the vehicle occupant 24 having certain resilience.

In this example, also on the bearing surface 142 a non-inflatable panel portion 176 is provided which is fixed to the bearing surface 142 along the periphery 174 of the region 170 having reduced depth.

Otherwise, the auxiliary airbag 130 may be designed just like the auxiliary airbag 30 of the first embodiment. Optionally, also a first flexible structure 48 may be provided in the neck portion 52.

Figure 5:
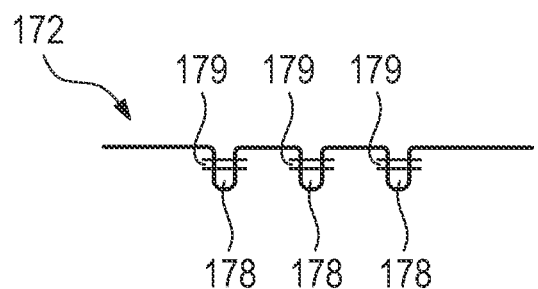
FIG. 5 shows a schematic sectional view of a non-inflatable panel portion of the auxiliary airbag of FIG. 4.

As shown in FIG. 5, in the non-inflatable panel portion 172 at least one fold 178 is optionally provided which is initially fixed by a means 179. The means 179 is a tear seam, for example, opening upon a predetermined load and releasing the fabric inside the fold 178. In this way, the resilience of the non-inflatable panel portion 172 and, thus, the flexibility and mobility of the cushion-shaped portion 156 can be influenced to a certain degree.

Figure 6:
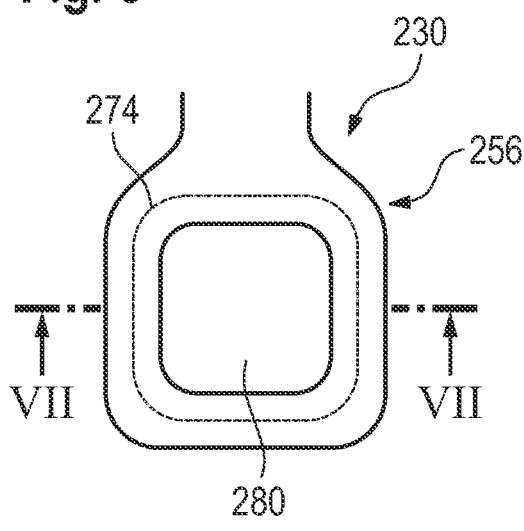
FIG. 6 shows a schematic front view onto an auxiliary airbag according to the invention as set forth in a third embodiment.
Figure 7:
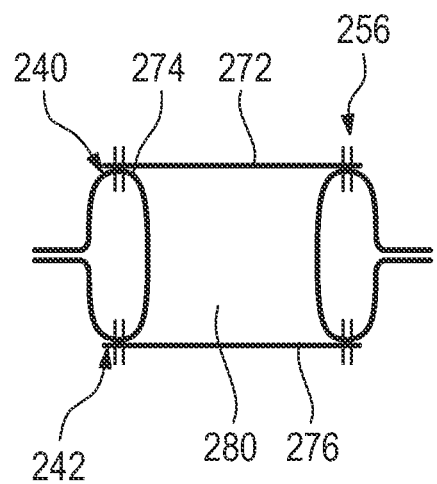
FIG. 7 shows a schematic sectional view of the auxiliary airbag of FIG. 6 along the line VII-VII.

FIGS. 6 and 7 illustrate a third embodiment of an auxiliary airbag 230.

In this case, in the only difference from the second embodiment, instead of the region 170 having reduced depth in the cushion-shaped portion 256, a cutout 280 is provided in the form of a continuous opening along the periphery 274 of which a non-inflatable panel portion 272, 276 is fixed on each of the baffle 240 and optionally also of the bearing surface 242. Just like the region 170 having reduced depth in the second embodiment, the cutout 280 covered by the non-inflatable panel portion 272 has the function to impart certain flexibility to the auxiliary airbag 230 so that it can follow a movement of the vehicle occupant 24 while the latter immerses into the auxiliary airbag 230.

The invention claimed is:

1. A vehicle occupant restraint system comprising a front airbag and an auxiliary airbag both of which are assigned to a joint vehicle seat, wherein the auxiliary airbag prior to deployment thereof is arranged in a roof region of a vehicle and, in a filled state, extends as a further front airbag ahead of a vehicle occupant and between the front airbag and the vehicle occupant in the assigned vehicle seat, with the filled auxiliary airbag bearing against the front airbag, wherein the auxiliary airbag has at least one flexible structure including bulges and recesses, wherein the at least one flexible structure comprises a first flexible structure in a neck portion of the auxiliary airbag which is configured at a transition from an inflation end to a cushion-shaped portion of the auxiliary airbag, wherein the first flexible structure in the filled state includes plural inflatable cells sequential along a vehicle vertical direction, each of the cells forming a bulge of a baffle, wherein the front airbag and the auxiliary airbag can be filled independently of each other so that optionally only the front airbag or the front airbag and the auxiliary airbag can be filled.

2. The vehicle occupant restraint system according to claim 1, wherein the auxiliary airbag includes an opposed bearing surface, wherein, in the filled state, the bearing surface of the auxiliary airbag rests on a baffle of the front airbag.

3. The vehicle occupant restraint system according to claim 2, wherein the auxiliary airbag is configured and arranged so that, in the filled state, the auxiliary bag covers at least 60% of the baffle of the front airbag) when viewed in a direction toward a vehicle front end.

4. The vehicle occupant restraint system according to claim 1, wherein the auxiliary airbag has a filling volume of about 20-30 liters and/or, in the filled state, has an internal pressure of approximately 100 to 500 hPa.

5. The vehicle occupant restraint system according to claim 1, wherein a position detection system for detecting a position of the assigned vehicle seat and/or of the vehicle occupant in the vehicle seat as well as a control unit which decides on optionally releasing the auxiliary airbag in response to data supplied by the position detection system are provided.

6. The vehicle occupant restraint system according to claim 1, wherein the flexible structure comprises a second flexible structure in a free end region of the auxiliary airbag which includes plural second inflatable cells sequential along a vehicle transverse direction, each of the second cells forming a bulge on the baffle of the auxiliary airbag.

7. The vehicle occupant restraint system according to claim 1, wherein, in the filled state, the auxiliary airbag includes a region having reduced depth or a cutout in an area of the baffle which is spanned by a non-inflatable panel portion.

8. The vehicle occupant restraint system according to claim 7, wherein the non-inflatable panel portion includes at least one fold which is fixed by a means opening upon a predetermined load.

9. The vehicle occupant restraint system according to claim 1, wherein the auxiliary airbag has a filling volume of approximately 25 liters, and/or, in the filled state, has an internal pressure of approximately 200-300 hPa.

10. A vehicle occupant restraint system comprising a front airbag and an auxiliary airbag both of which are assigned to a joint vehicle seat, wherein the auxiliary airbag prior to deployment thereof is arranged in a roof region of a vehicle and, in a filled state, extends as a further front airbag ahead of a vehicle occupant and between the front airbag and the vehicle occupant in the assigned vehicle seat, with the filled auxiliary airbag bearing against the front airbag wherein, in the filled state, the auxiliary airbag includes a region having reduced depth or a cutout in an area of a baffle which is spanned by a non-inflatable panel portion, wherein the non-inflatable panel portion includes at least one fold which is fixed by a means opening upon a predetermined load.

11. A vehicle occupant restraint system comprising a front airbag and an auxiliary airbag both of which are assigned to a joint vehicle seat, wherein the auxiliary airbag prior to deployment thereof is arranged in a roof region of a vehicle and, in a filled state, extends as a further front airbag ahead of a vehicle occupant and between the front airbag and the vehicle occupant in the assigned vehicle seat, with the filled auxiliary airbag bearing against the front airbag, wherein the auxiliary airbag has at least one flexible structure including bulges and recesses, wherein the at least one flexible structure comprises a first flexible structure in a neck portion of the auxiliary airbag which is configured at a transition from an inflation end to a cushion-shaped portion of the auxiliary airbag, wherein the first flexible structure in the filled state includes plural inflatable cells sequential along a vehicle vertical direction, each of the cells forming a bulge of a baffle, wherein, in the filled state, the auxiliary airbag includes a region having reduced depth or a cutout in an area of the baffle which is spanned by a non-inflatable panel portion, and wherein the non-inflatable panel portion includes at least one fold which is fixed by a means opening upon a predetermined load.

* * * * *